March 6, 1962  R. WESTBURY ETAL  3,023,638
CONSTANT SPEED UNITS

Filed Nov. 10, 1959  4 Sheets-Sheet 1

INVENTORS
Roy Westbury,
Jerzy Leon Courtenay &
Thomas Edwards
BY: Moses, Nolte & Nolte
Attorneys

United States Patent Office 3,023,638
Patented Mar. 6, 1962

3,023,638
CONSTANT SPEED UNITS
Roy Westbury, Bridgnorth, Jerzy Leon Courtenay, Tettenhall, Wolverhampton, and Thomas Edwards, Codsall, England, assignors to H. M. Hobson Limited, London, England, a company of Great Britain
Filed Nov. 10, 1959, Ser. No. 852,011
5 Claims. (Cl. 74—687)

This invention relates to variable speed drives and is particularly applicable to a hydraulic torque converter for driving an output shaft at a constant speed notwithstanding variations in the rotational speed of an input shaft, comprising a rotary pump unit and a motor unit arranged to be rotated by liquid delivered by the pump unit, control mechanisms for respectively controlling the displacements of the pump and motor units which are operated in opposite senses by a governor responsive to the speed of rotation of the output shaft, and a double differential gear system interconnecting the two shafts and the rotors of the pump and motor units and providing a drive to the output shaft through a mechanical transmission path from the input shaft at an input speed at which the pump unit is locked against rotation and through another mechanical transmission path from the input shaft at a higher input speed at which the motor unit is locked against rotation, power being transmitted to the output shaft hydraulically and through both mechanical transmission paths at intermediate speeds of the input shaft.

Figure 1:
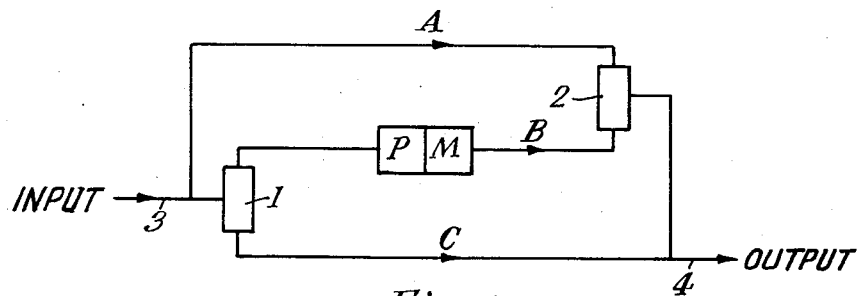
Figure 2:
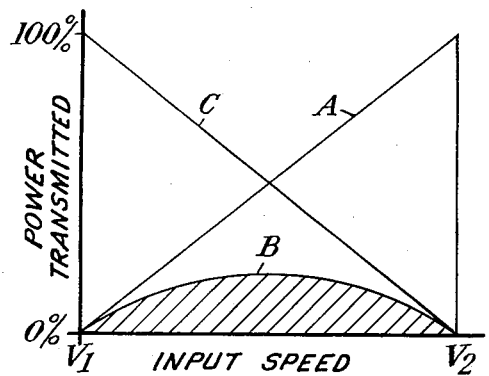
Figure 3:
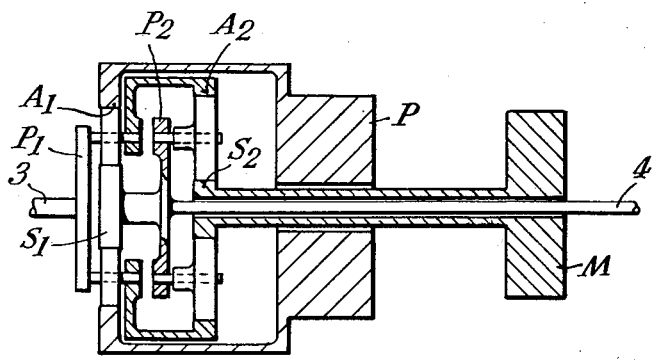
Figure 4:
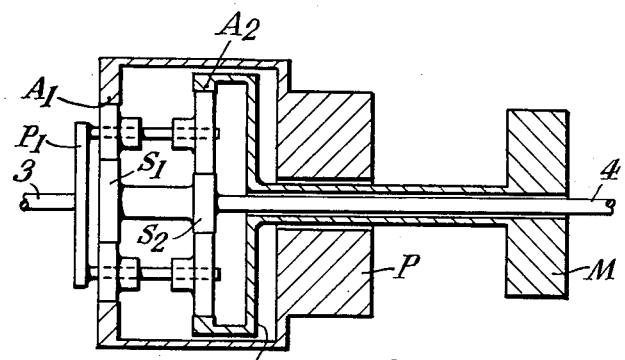
Figure 5:
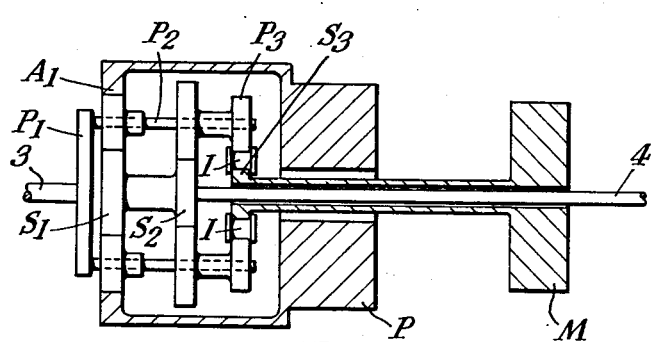
Figure 6:
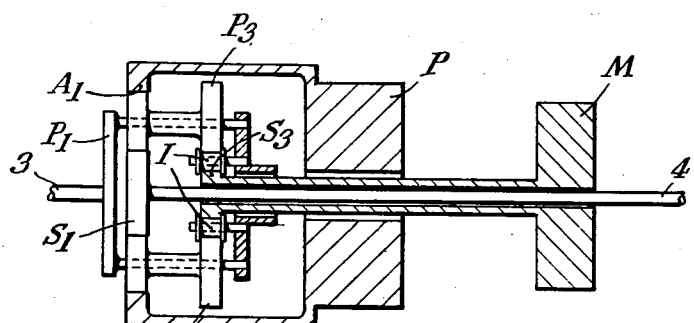
Figure 7:
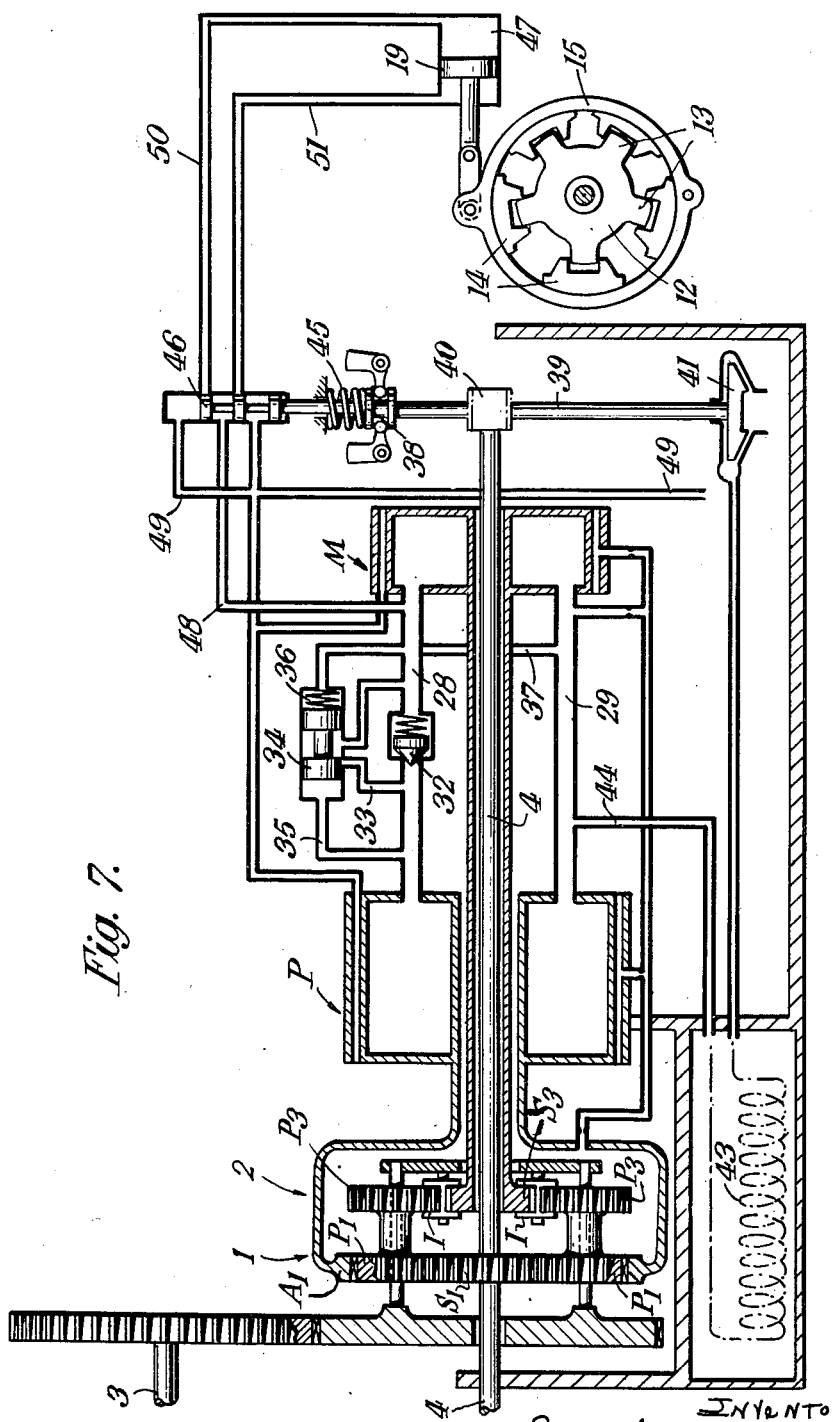
Figure 8:
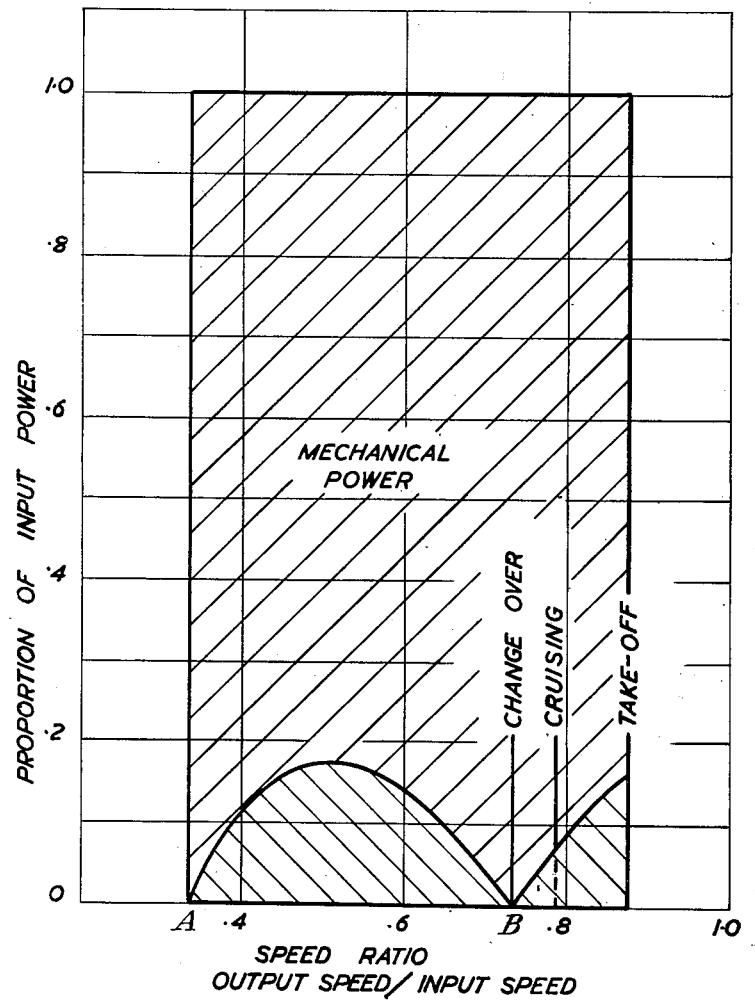

In the accompanying diagrammatic drawings:
FIG. 1 shows a known hydraulic torque convertor,
FIG. 2 shows graphically the characteristics of the torque convertor shown in FIG. 1,
FIG. 3 shows a torque convertor of the kind shown in FIG. 1 but provided with differential gears of the epicyclic type,
FIGS. 4, 5 and 6 show three alternative forms of torque convertor according to the invention,
FIG. 7 illustrates in more detail a torque convertor as shown in FIG. 6, and
FIG. 8 shows graphically the performance of the torque converter shown in FIG. 7 of the drawings.

In FIG. 1 the pump and motor units of the torque converter are respectively indicated at P and M and two differential gears, assumed to be of the type used in the driving axles of motor vehicles, are shown at 1 and 2. The input and output shafts are respectively indicated at 3 and 4. The input shaft 3 is connected to the common member of the first differential gear 1, while the common member of the second differential gear 2 is connected to the output shaft 4. Accordingly the differential gear 1 provides a step up ratio and the differential gear 2 a step down ratio.

The displacements of the pump and motor units are controlled by swashplates or eccentric rings which are linked together and adjusted in opposite senses by the governor. At a certain input speed $V_1$, FIG. 2, the displacement of the motor unit M is adjusted to zero by the governor and the rotor of the pump unit P is hydraulically locked. The whole of the power is therefore transmitted through the mechanical path C. The output shaft 4 runs at twice the speed of the input shaft 3 and the motor unit M spins idly. At a certain higher input speed $V_2$, the displacement of the pump unit P is adjusted to zero by the governor, the motor unit M is hydraulically locked and the whole of the power is transmitted through the alternative mechanical path A. The output shaft 4 turns at half the speed of the input shaft 3 and the pump unit P spins idly. As indicated in FIG. 2, between the input speeds $V_1$ and $V_2$, power is transmitted through both mechanical paths A and C and also hydraulically as represented by the curve B. The shaded area beneath the curve B represents the hydraulic torque conversion. With this known system, the overall range of the speed ratio $$\frac{\text{output speed}}{\text{input speed}}$$

of the torque converter over the zone $V_1$, $V_2$, hereinafter termed the overall speed ratio, is 4:1. The overall speed range of an aircraft jet engine is, however, only of the order of 2.5:1, and the present invention has for its object to provide a hydraulic torque converter which of lower overall speed ratio and is suitable, among other uses, for driving an alternator at constant speed from an aircraft jet engine. A typical requirement in such a case is that the alternator should run at a constant speed of the order of 6000–8000 r.p.m. when driven by an engine having a maximum speed of 6000–7000 r.p.m. Achievement of a lower overall speed ratio is desirable as its effect will be to reduce the amount of power transmitted hydraulically and enable the use of hydraulic components which are smaller, run more slowly and operate at lower pressure.

While it is more convenient to use epicyclic gear trains placed side by side than the bevel-type differential gears referred to with reference to FIG. 1, it is impossible to obtain a low overall speed ratio with epicyclic gear trains connected as shown in FIG. 1. This will be clear from FIG. 3 of the drawings. This shows the input shaft 3 connected to the planet carrier $P_1$ of the first gear train, the annulus $A_1$ of the first gear train connected to the pump unit P the sun wheel $S_1$ of the first gear train connected to the planet carrier $P_2$ of the second gear train and to the output shaft 4, the annulus $A_2$ of the second gear train connected to the input shaft 3 via the planet carrier $P_1$ and the sun wheel $S_2$ of the second gear train connected to the motor unit M.

An epicyclic gear train cannot give equal division of torque between its annulus and sun wheel because the planet wheels, which must be of finite radius, react on the annulus and the sun wheel at different radii. In practice, the nearest approximation to equal division of torque which can be attained is division of a torque T applied to the planet carrier in the ratio of ⅔T to the annulus and ⅓T to the sun wheel. On the assumption of such a torque division in the case of FIG. 3, the output torque will be ⅓T when the pump unit P is locked, and ⅔T when the motor unit M is locked. The overall speed ratio is thus greater than before.

According to the invention, we provide a hydraulic torque converter as described above of low overall speed ratio and in which both differential gears have their common member (i.e. the planet carrier) driven by the input shaft and both are connected to the output shaft to drive it at ratios in the same sense but of somewhat different magnitude. Preferably both differential gears provide a step up ratio and are of the epicyclic type.

A torque converter according to the invention in its simplest form is illustrated diagrammatically in FIG. 4 of the drawings. Here the input shaft 3 is connected to the planet carriers $P_1$, $P_2$ of both gear trains, the two sun wheels $S_1$, $S_2$ are connected to the output shaft 4, the annulus $A_1$ is connected to the rotor of the pump unit P and the annulus $A_2$ is connected to the rotor of the motor unit M. By providing the epicyclic train $S_1$, $P_1$, $A_1$ with a ratio of 5:1 and the other epicyclic train $S_2$, $P_2$, $A_2$ with a ratio 2.5:1 an overall speed range of 2:1 would be obtained. However, such an arrangement would be unsuitable for driving an alternator in an aircraft and for this purpose it is desirable for the ratio of the first gear train to be 3:1. This raises a difficulty because, to obtain an overall speed range of 2:1, the second gear train would require a ratio of 1.5:1, which is impracticable for a normal epicyclic gear train. This difficulty can, however, be circumvented by utilizing a two-stage reduction in the second train as shown in FIG. 5 of the drawings. Here, the annulus of the second epicyclic train is omitted and the drive to the motor unit M is through a second stage constituted by planet wheels $P_3$ mounted on the planet carrier $P_2$, idler pinions I and a sun wheel $S_3$. The ratio of the second gear train can be made 1.5:1 by suitable choice of the ratios in its first and second stages, and if the ratio in the second stage is correctly chosen the wheels $P_2$, $S_2$ can be omitted, thus yielding the simplified and preferred form of gearing shown in FIG. 6 of the drawings. The first gear train in this case has a ratio of 3:1 and the second gear train a ratio of 1.5:1, with a resultant overall speed ratio of 2:1.

The torque converter shown in FIG. 7 which is intended for driving an alternator at constant speed from an aircraft jet engine will not be described in great detail as it is fully described in U.S. application No. 786,883, now Patent No. 2,946,194. The double differential gear is of the construction described above with reference to FIG. 6 and the first gear train 1 has a ratio of 3:1 and the second gear train 2 a ratio of 1.5:1. The pump and motor units P and M each comprise a vaned rotor 12 on which are rockably mounted slippers 14 coacting with an eccentric ring 15 pivoted on a fixed pivot 16. The eccentric rings of the pump and motor units are coupled together as more fully described in U.S. application No. 786,883, so that they may be moved equally but in opposite directions about their pivots by a servo piston 19.

At the point A, FIG. 8, corresponding approximately to ground idling speed of the aircraft engine the eccentricity of the eccentric ring of the motor is zero and the pump P is hydraulically locked. The annulus $A_1$ is accordingly stationary, the output shaft being driven by the first gear train 1 through $P_1$, $S_1$ and the motor being rotated by the gears $P_3$, I, $S_3$. At the point B (FIG. 8) the eccentricity of the eccentric ring 15 of the pump is zero and the motor M is hydraulically locked. The sun wheel $S_3$ is stationary and the speed ratio is determined by the second gear train 2 and the wheels $P_1$, $S_1$ the pump being rotated by the annulus $A_1$. At points between A and B, the pump P acts as a pump, delivering liquid under pressure to the motor M along the passage 28, liquid returning from the motor to the pump along the passage 29. The hydraulic power transmitted by the torque converter is defined by the curve AEB, FIG. 8. Under these conditions a non-return valve 32 in the passage 28 opens to allow liquid to flow from the pump to the motor. In parallel with the passage 29 is a passage 33, normally closed by an unloading valve 34. When the non-return valve 32 is open (as shown in FIG. 7) the valve 34 is subject at one end, through a passage 35, to the pressure in the passage 28 and at the other to the pressure of a spring 36 and also, through a passage 37, to the pressure in the passage 29. When the input speed exceeds that indicated at B in FIG. 8, the flow reverses, the motor M acting as a pump and the pump as a motor. As the result the non-return valve 32 closes. When the valve 32 is closed at change-over and beyond, the valve 34 is subject to a reduced pressure on the pump side of the non-return valve 32. The consequent reduction of pressure in the passage 35 then causes the unloading valve 34 to move to its alternative position and open the passage 33 to allow restricted flow of liquid from M to P and therefore the maintenance of constant speed of the output shaft. When in the open position, the unloading valve 34 supports the high pressure generated by the torque reaction at the motor M and isolates the pump from this high pressure.

Control of the servo piston 19 is effected by means of a flyweight governor 38 on a layshaft 39 driven, through worm gearing 40, from the output shaft 4. The shaft 39 also drives a centrifugal pump 41, which draws oil from a sump 42 and supplies it, via a cooler 43, to a line 44 communicating with the passage 29. This oil provides a cooling and make-up flow for the pump and motor. The governor 38, which is loaded by a spring 45, coacts with a servo control valve 46 which is movable from the neutral position shown in FIG. 7 to effect alternative connections between lines 50 and 51 leading to opposite ends of the servo cylinder 47 and pressure and exhaust lines 48, 49. When the output shaft 4 overspeeds, the governor 38 causes the servo piston 19 to move in the direction to increase the displacement of the pump and to decrease the displacement of the motor. The reverse action occurs when the output shaft underspeeds.

What we claim as our invention and desire to secure by Letters Patent is:

1. A hydraulic torque converter of low overall speed ratio for driving an output shaft at a constant speed notwithstanding variations in the rotational speed of an input shaft, comprising in combination with said input shaft and said output shaft, a pump unit and a motor unit each including a rotor, the rotor of the motor unit being arranged to be rotated by liquid delivered to the motor unit by the pump unit, a governor responsive to the speed of rotation of the output shaft, control mechanisms for respectively controlling the displacements of the pump and motor units which are operated in opposite senses by said governor, and a double differential gear system including two epicyclic gear trains, drivingly interconnecting the two shafts and the rotors of the pump and motor units and providing a drive to the output shaft through a mechanical transmission path from the input shaft at an input speed at which the pump unit is locked against rotation and through another mechanical transmission path from the input shaft at a higher input speed at which the motor unit is locked against rotation, power being transmitted to the output shaft hydraulically and through both mechanical transmission paths at intermediate speeds of the input shaft, said epicyclic gear trains being drivingly connected to the output shaft to drive it at ratios in the same sense but of somewhat different magnitude and each comprising a planet carrier coupled to and driven by the input shaft, said gear trains including gear elements driven by planet wheels on their planet carriers and connected to drive the rotors of the pump and of the motor respectively and one at least of said gear trains including a further gear element driven by its planet wheels and connected to the output shaft.

2. A torque converted as claimed in claim 1, in which both gear trains provide a step-up ratio.

3. A torque converted as claimed in claim 1, in which the gear elements of each gear train include an annulus and a sun wheel, the sun wheels of both gear trains being connected to the output shaft, the annulus of one gear train being connected to the rotor of the pump and the annulus of the other gear train being connected to the rotor of the motor.

4. A torque converted as claimed in claim 1, in which the gear elements of one gear train include an annulus connected to drive the rotor of the pump and a sun wheel connected to the output shaft and the gear elements of the other gear train include a first sun wheel connected to the output shaft and meshing directly with its planet wheels and a second sun wheel connected to drive the rotor of the motor and driven through idler pinions from said planet wheels.

5. A torque converter as claimed in claim 1, in which the gear elements of one gear train include an annulus connected to drive the rotor of the pump and a sun wheel connected to the output shaft and the gear elements of the other gear train include a sun wheel connected to drive the rotor of the motor and driven through idler pinions from its planet wheels.

References Cited in the file of this patent

UNITED STATES PATENTS

| | | |
|---|---|---|
| 2,750,812 | Mirone | June 19, 1956 |
| 2,924,123 | Giles | Feb. 9, 1960 |
| 2,946,194 | Westbury | July 26, 1960 |

FOREIGN PATENTS

| | | |
|---|---|---|
| 692,056 | Great Britain | May 27, 1953 |
| 817,654 | Great Britain | Aug. 6, 1959 |

OTHER REFERENCES

"Automatic and Efficient," an article on the M.I.R.A. Experimental Hydrostatic Transmission Unit; published by The Autocar, issue of October 25, 1957, on pages 660–662; received in Div. 12, November 21, 1957.